United States Patent
Schaufler

(10) Patent No.: US 8,246,513 B2
(45) Date of Patent: Aug. 21, 2012

(54) METHOD AND APPARATUS FOR CONTROLLING TRANSMISSION FUNCTIONS IN A VEHICLE TRANSMISSION

(75) Inventor: Mario Schaufler, Kehl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 1066 days.

(21) Appl. No.: 12/217,528

(22) Filed: Jul. 3, 2008

(65) Prior Publication Data

US 2009/0029827 A1   Jan. 29, 2009

Related U.S. Application Data

(60) Provisional application No. 60/958,177, filed on Jul. 3, 2007.

(51) Int. Cl.
*F16H 59/60* (2006.01)
(52) U.S. Cl. .......................... 477/97; 477/131; 477/138
(58) Field of Classification Search .................. 477/97, 477/127, 130, 131, 138
See application file for complete search history.

(56) References Cited

U.S. PATENT DOCUMENTS

| | | | |
|---|---|---|---|
| 5,191,504 A * | 3/1993 | Narisawa et al. | 361/186 |
| 7,730,875 B2 * | 6/2010 | Mori et al. | 123/446 |
| 7,979,229 B2 * | 7/2011 | Otaka et al. | 702/98 |
| 2007/0030068 A1 * | 2/2007 | Motonobu et al. | 330/257 |

FOREIGN PATENT DOCUMENTS

DE   102008027076 A1 *   1/2009

* cited by examiner

*Primary Examiner* — Ha D. Ho
(74) *Attorney, Agent, or Firm* — Alfred J. Mangels

(57) ABSTRACT

A method and apparatus for controlling transmission functions in a transmission of a motor vehicle by an electromagnetically actuated control valve. The control valve is controlled by a control device that includes a stored valve characteristic curve to provide a temperature-dependent and a target-current-dependent overlay, so that a symmetrical target value oscillation around a target current value is achieved. The characteristic curve for controlling the control valve is adapted at least partially as a function of a current value and a temperature.

10 Claims, 1 Drawing Sheet

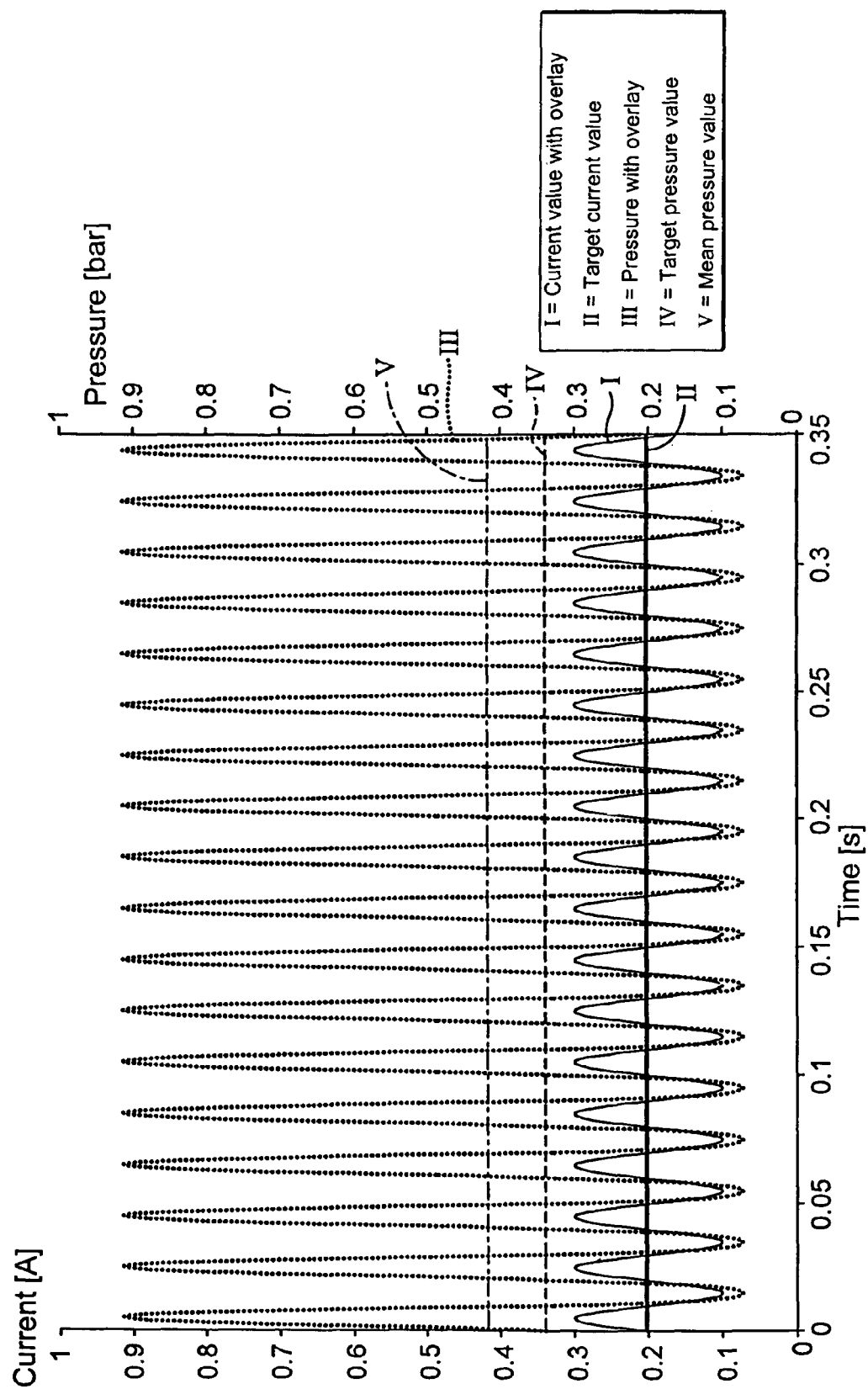

METHOD AND APPARATUS FOR CONTROLLING TRANSMISSION FUNCTIONS IN A VEHICLE TRANSMISSION

BACKGROUND OF THE INVENTION

1. Field of the Invention

The present invention relates to a method and apparatus for controlling transmission functions in a transmission of a motor vehicle by means of an electromagnetically actuated control valve. The control valve is actuated by means of a temperature-dependent and target-current-dependent overlay, so that a symmetrical current value oscillation around the particular target current value is achieved.

2. Description of the Related Art

A method and apparatus for controlling transmission functions in a transmission of a motor vehicle are adequately known from existing motor vehicle technology. Generally a proportional valve is used as the control valve, to actuate a clutch pressure, a shifting pressure in the transmission, or a cooling flow, for example. To prevent so-called stick-slip effects and to reduce hysteresis, the proportional valve is actuated with a temperature-dependent and target-current-dependent overlay. The overlay is a symmetrical current value oscillation around the target current value. If the characteristic of the proportional valve is linear, those overlays also result in symmetrical pressure oscillations around the target pressure.

Because of the non-linearity of the characteristic curve of the proportional valve, a shift of the mean pressure comes about in the non-linear region, since the non-linearity brings about a change in the rise of the characteristic curve of the proportional valve. For example, when there is a positive change in the rise of the characteristic curve, an increase in the current value also brings about an increase in the pressure value. On the other hand, a reduction of the current value brings about only a small reduction of the pressure in this non-linear region. That causes a shift in the mean pressure value. In addition, the temperature-dependency of the overlay, which increases the overlay amplitude at low temperatures because of the elevated oil viscosity, can further amplify the shift in the mean pressure.

Accordingly, an object of the present invention is to provide a method and apparatus of the type identified at the beginning, in which a shift of the mean pressure is also prevented in the non-linear region of the characteristic curves of the control valve.

SUMMARY OF THE INVENTION

Accordingly, a method in accordance with the present invention is provided for controlling transmission functions in a transmission of a motor vehicle by means of an electromagnetically actuated control valve. The control valve is actuated by means of a temperature-dependent and target-current-dependent overlay, so that a symmetrical current value oscillation around the particular target current value is achieved. In accordance with the present invention, the characteristic curve for controlling the control valve can be at least partially adapted as a function of the target current and the temperature.

An appropriate adjustment of the characteristic curve is achieved as a function of the target current and the temperature, so that an undesired shift of the mean pressure is prevented. The adjustment is especially important particularly at low temperatures because of the increased oil viscosity. Furthermore, by preference only the non-linear region of the characteristic curve of the control valve or proportional valve can be adapted. It is also possible, however, for the adaptation to be expanded to additional regions of the characteristic curve.

Preferably, the proposed method can be utilized with a directly actuated valve, or also with a so-called pilot pressure valve. Other areas of application are also conceivable, however.

A variant embodiment of the present invention can include the provision that in the method in accordance with the invention the adaptation of the characteristic curve of the proportional valve is carried out as a function of the change in the increase of the characteristic curve. Thus, depending upon whether a positive or a negative change in the increase of the characteristic curve is present, the current value registered by the characteristic curve can be increased or reduced in order to obtain the desired pressure value. It is also conceivable for the adaptation to be carried out as a function of other parameters.

The adjustment provided by the present invention of the characteristic curve can be accomplished in various ways. For example, a possible refinement of the arrangement can include the provision that when there is a change in the increase of the characteristic curve a predetermined offset value is added to or subtracted from the particular target current value. Hence, the offset value can be chosen so that the mean target current value is increased or reduced, in order to obtain a set pilot pressure, for example. In that way it is possible to achieve a desired control of a transmission component, for example, by means of a pilot pressure valve.

Another possibility in accordance with the present invention for carrying out an adaptation of the characteristic curve in the non-linear region can provide that when there is a change in the increase of the characteristic curve of the proportional valve, positive or negative half-waves of the symmetrical current value oscillation are at least reduced. By reducing the negative or positive half-waves, the mean target current value can be changed accordingly, in order to obtain the set pilot pressure.

The method provided in accordance with the present invention can by preference be employed to control a clutch pressure. Other control arrangements are also conceivable with the method in accordance with the invention. For example, the control of a shift pressure or a cooling flow. Using the method to control the clutch pressure yields an additional benefit, since the non-linear region of the characteristic curve is used in particular for comfort-relevant functions, for example driving off, so that the driving performance of the motor vehicle can be improved perceptibly.

The problem to which the invention is directed is also solved by apparatus for controlling transmission functions in a transmission of a motor vehicle having an electromagnetically actuated control valve. The target current for controlling the control valve is controllable by a control device by means of a characteristic curve, wherein a characteristic curve for controlling the control valve, adapted as a function of the target current and the temperature, is stored in the control device.

The apparatus in accordance with the present invention can preferably be employed to carry out the above-identified method. Other possibilities for utilization are also conceivable. Preferably, a directly actuated valve or a pilot pressure valve can be provided as the control valve. Other types of valves can also be utilized.

The adaptation carried out in accordance with the proposed method for controlling the clutch pressure or the like, in particular for the non-linear region of the characteristic curve of the proportional valve, can be stored by the software in the control device, in particular the transmission control device or the clutch control device, so that when there is a shift in the mean pressure value a corresponding adjustment of the target current value is facilitated in an extremely simple manner.

BRIEF DESCRIPTION OF THE DRAWING

The present invention will be explained in greater detail below on the basis of the drawing, which is a graph of current and pressure versus time

DESCRIPTION OF THE PREFERRED EMBODIMENTS

The single FIGURE of the drawing shows a graph with a plurality of current value curves and pressure value curves that are shown over time. Curve I shows a current value progression with an overlay. Curve II characterizes the curve of the target current value, while curve III shows a pressure value progression over time. Finally, curve IV characterizes a target pressure value progression, while curve V shows a progression of the mean pressure value.

In the method for controlling transmission functions in a transmission of a vehicle, a pilot valve is actuated by means of a temperature-dependent and target-current-dependent overlay, so that a symmetrical current value oscillation I around the particular target current value II is achieved. Because of the non-linearity of regions of the characteristic curve of the proportional valve, a shift of the mean pressure value curve V occurs in the non-linear region of the characteristic curve. For example, at a mean target current value of 200 mA a mean static pressure value of 400 mbar is set. The symmetrical current value overlay of 100 mA, for example, produces a shift of the mean current value. For that reason, there should also be no shift brought about in the mean pressure value. However, when there is a positive change, for example in the increase of the characteristic curve of the proportional valve, an increase in the current value brings about an increase in the pressure value, which is approximately 500 mbar for the proportional valve under consideration. In contrast, the reduction in the current value brings about a reduction of only 200 mbar in the pressure value in that region. That causes a shift in the mean pressure value curve V from approximately 400 mbar static to approximately 550 mbar.

For that reason the control for the linear region of the characteristic curve of the proportional valve, in which a mean rise in the characteristic curve is determined by measuring pressure and current at two defined points, cannot be used for the non-linear region. For that reason, in accordance with the present invention a corresponding software adjustment of the characteristic curve is carried out as a function of the target current value and the temperature. That can be achieved as a function of the current value and the temperature, by adding a negative offset if the change in the rise of the characteristic curve is positive, or a positive offset if the change in the rise of the characteristic curve is negative, for example. That reduces the mean current value and thus results in a pressure value that corresponds to the set and desired pressure value.

Another possibility for carrying out the adaptation in accordance with the present invention is to make a reduction in the positive half-wave of the current value overlay curve I when there is a positive change in the rise of the characteristic curve, in order to lessen the deviation between the set mean current value II and the static pressure value set with it, and the real pressure value.

Since the non-linear region of the characteristic curve of the proportional valve is used for comfort-relevant functions, such as driving off, for example, the driving performance of the vehicle can be improved significantly in that way.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for controlling transmission functions in a motor vehicle transmission, said method comprising the steps of: providing an electromagnetically actuated control valve; controlling the control valve by means of a temperature-dependent and target-current-dependent overlay, so that a symmetrical current value oscillation around a target current value is achieved; and at least partially adapting a valve characteristic curve for controlling the control valve as a function of the target current and the temperature.

2. A method in accordance with claim 1, wherein the adaptation of the characteristic curve occurs in a non-linear region of the characteristic curve.

3. A method in accordance with claim 1, wherein at least one of a directly controlled valve and a pilot pressure valve is the electromagnetically actuated control valve.

4. A method in accordance with claim 1, wherein the adaptation step is carried out as a function of a change in an increase of the valve characteristic curve.

5. A method in accordance with claim 4, including the step of adding to or subtracting from the target current value a predetermined offset value when there is a change in an increase of the valve characteristic curve.

6. A method in accordance with claim 5, wherein the predetermined offset value is chosen so that a mean target current value is increased or reduced in order to obtain a set pilot pressure.

7. A method In accordance with claim 4, wherein the change in the increase of the valve characteristic curve reduces positive or negative half-waves of the symmetrical current value oscillation.

8. A method in accordance with claim 7, wherein the reduction of the half-waves is chosen to obtain a set pilot pressure.

9. A method in accordance with claim 3, wherein a clutch pressure for controlling a clutch is set by a pilot valve.

10. A method in accordance with claim 9, wherein when controlling the clutch pressure to start the vehicle in motion an adapted non-linear section of the valve characteristic curve is used.

* * * * *